B. D. STEVENS.
SAWMILL CARRIAGE.
APPLICATION FILED JULY 5, 1910.
1,093,215.
Patented Apr. 14, 1914.
2 SHEETS—SHEET 1.
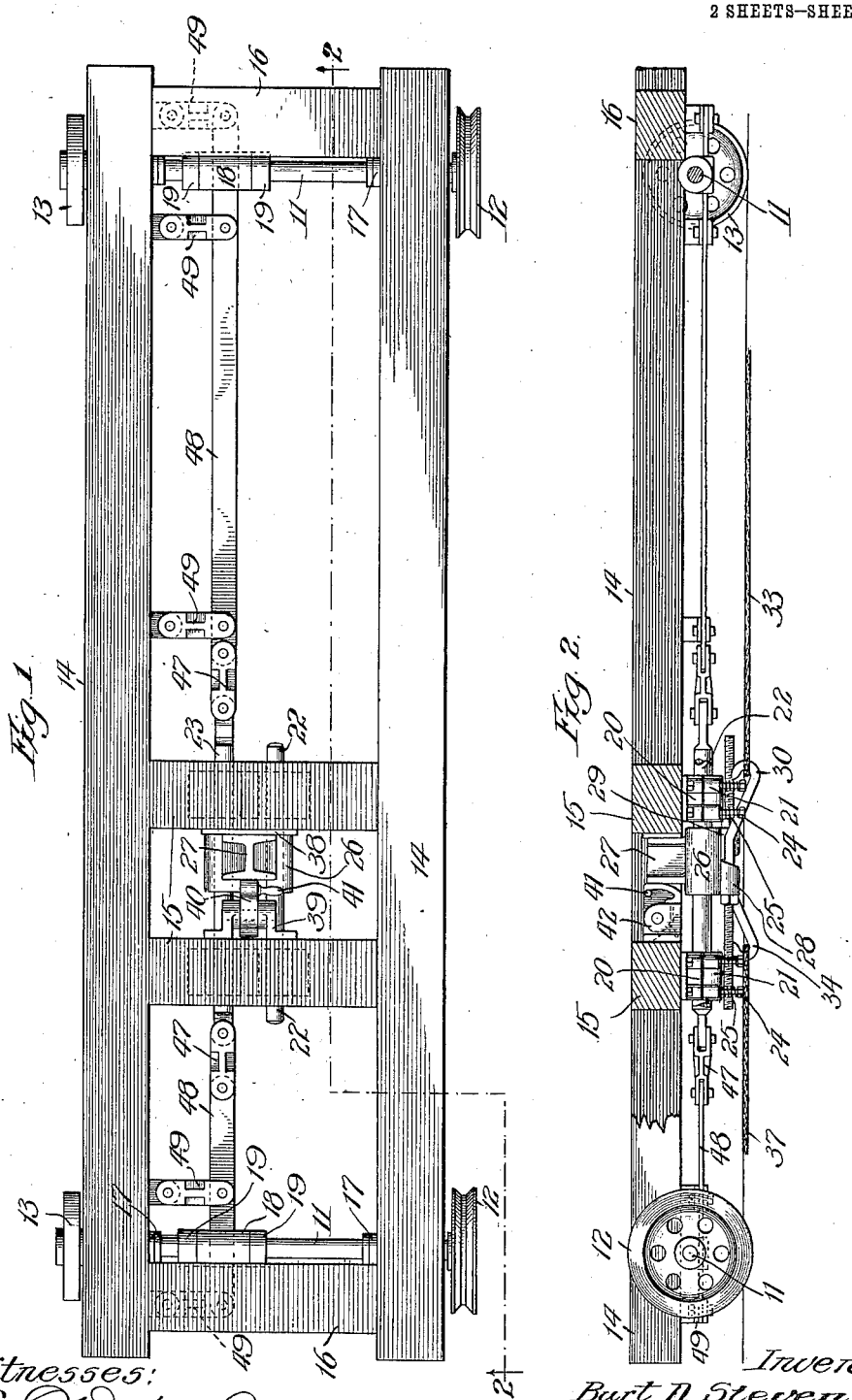

B. D. STEVENS.
SAWMILL CARRIAGE.
APPLICATION FILED JULY 5, 1910.
1,093,215.
Patented Apr. 14, 1914.
2 SHEETS—SHEET 2.
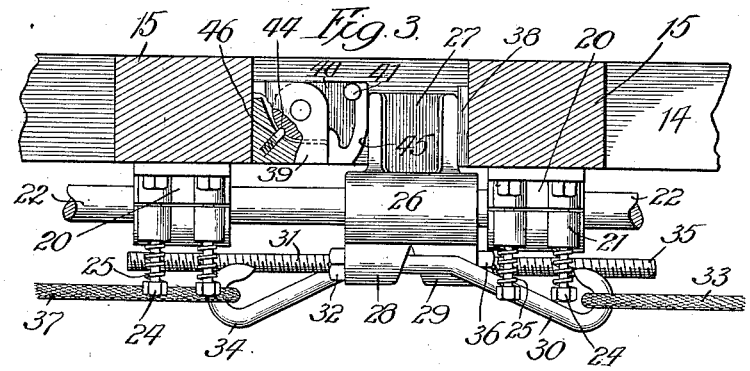
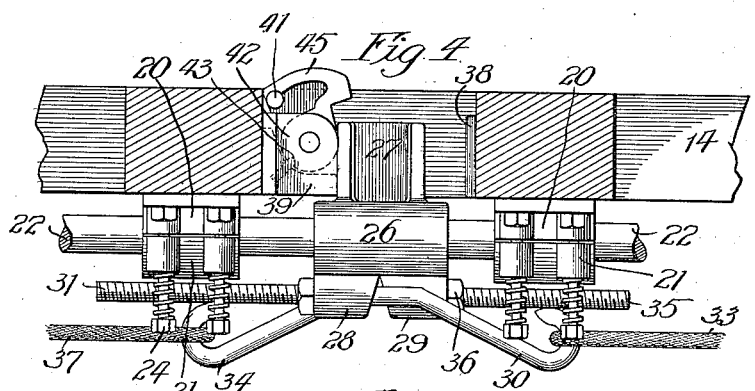
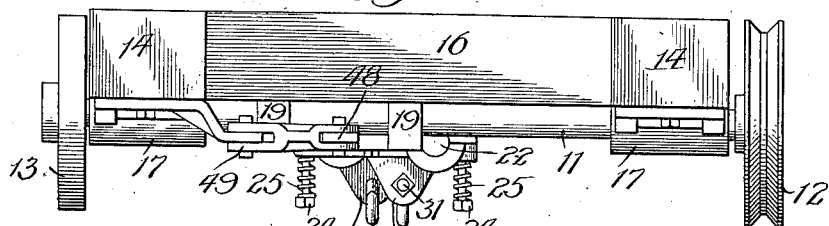
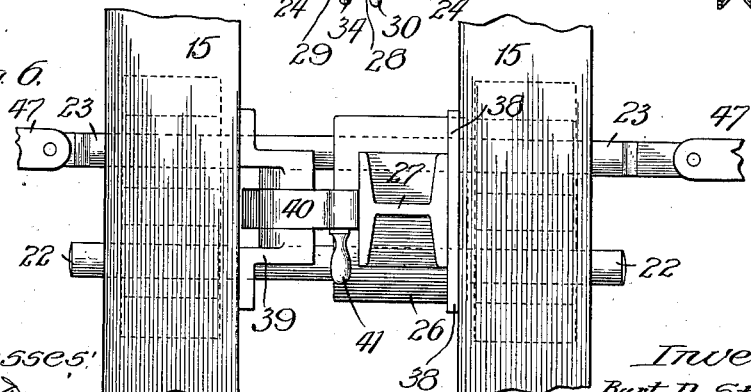
Inventor:
Burt D. Stevens

UNITED STATES PATENT OFFICE.

BURT D. STEVENS, OF BELOIT, WISCONSIN, ASSIGNOR TO THE BERLIN MACHINE WORKS, OF BELOIT, WISCONSIN, A CORPORATION OF WISCONSIN.

SAWMILL-CARRIAGE.

1,093,215.

Specification of Letters Patent.

Patented Apr. 14, 1914.

Application filed July 5, 1910. Serial No. 570,349.

*To all whom it may concern:*

Be it known that I, BURT D. STEVENS, a citizen of the United States, residing at Beloit, in the county of Rock and State of Wisconsin, have invented certain new and useful Improvements in Sawmill-Carriages, of which the following is a specification.

My invention relates to saw mill carriages, and has particular reference to mechanism which is adapted to automatically shift the platform of the carriage laterally in the sawing of logs into boards or planks so that the log will be clear of the saw when the former is returned to its initial position.

It will be apparent that when a log is sawed longitudinally in a saw mill, it will be necessary to move the log laterally away from the saw when the carriage is returned to its original position preparatory to the next cut, otherwise, the saw might be thrown out of adjustment and the log itself subjected to more or less damage.

The object of my invention is to provide a simple and efficient mechanism which will automatically accomplish the lateral shifting of the platform of the carriage without shock or jar to the carriage or other parts. I attain this object by mounting the platform on a pair of axles so that the former may have free lateral movement within certain predetermined limits on the latter. The shifting mechanism is directly associated with the cables, which move the carriage in a forward and backward direction. The platform is also connected by means of toggles with longitudinally movable shifting rods which are, in turn, actuated by the cables above mentioned. These rods are mounted on the underlying framework of the carriage in such manner that they have no lateral movement so that when longitudinal movement of the shifting rods takes place, the platform of the carriage is necessarily moved laterally by means of the toggle connections above mentioned. One particular advantage of this construction is that the lateral movement of the platform occurs before the carriage, as a whole, begins to move.

In mechanism of this character, the reversal of the carriage-moving means shifts the carriage laterally before imparting motion thereto along the track. This necessitates a loose connection between the carriage and the means for moving the same.

It is another object of my invention to provide a form of connection between the carriage and the operating means such that the taking up of this looseness will not result in a jar to the machine.

It sometimes happens that it is desirable to move the carriage a short distance backward while a cut is being made. In order to accomplish this and still prevent lateral movement of the platform, I provide a retainer which consists of a cam serving to prevent longitudinal movement of the shifting rods above mentioned.

These and other advantages of my invention will be more apparent by reference to the accompanying drawings representing a preferred embodiment of my improvements and in which:

Figure 1 is a plan view of the carriage showing the platform and shifting mechanism. Fig. 2 is a vertical longitudinal section on the line 2—2 of Fig. 1. Fig. 3 is an enlarged fragmentary vertical longitudinal section showing the retainer for preventing lateral movement of the platform. Fig. 4 is a view similar to Fig. 3 except that the retainer is moved into inoperative position. Fig. 5 is an enlarged end elevation of the carriage. Fig. 6 is an enlarged fragmentary plan view showing part of the platform and certain portions of the shifting mechanism.

Mounted on the ends of the axles 11, 11 are the wheels 12, 12 having V-shaped treads adapted to engage a track which is of corresponding section. On the opposite end of each axle is mounted the wheel 13 having a flat tread, so that it will be apparent that the carriage's travel is directed by the track which is engaged by the wheels 12, 12.

The platform 14, having the central cross members 15, 15, and the end cross members 16, 16, is mounted on the axles 11, 11 by means of the collars 17 which are laterally movable on the axles. Also loosely mounted on each of the axles 11, is the sleeve 18 which is prevented from lateral movement by the collars 19 which are suitably pinned to the axles 11 so as to be rigidly connected therewith.

Attached to the under sides of the cross members 15, 15 of the platform 14, are the journal boxes 20, 20 which together with the boxes 21, 21 form the bearings for the shafts 22 and 23. Each of the boxes 21, 21 is secured to its companion box 20 by means of the bolts 24 on which are mounted the springs 25, so that the boxes 21 have a resilient bearing on the shafts 22 and 23. Rigidly mounted on the shafts 22 and 23 is the shifting block 26 having the upper I-shaped extension 27 and the lower projections 28 and 29. Passing through the projection 28 is the hook 30 which has the threaded portion 31 and is held in position by means of the nut 32. Attached to the hook 30 is the operating cable 33 which thus serves to move the carriage to the right, as indicated in Figs. 1 to 4 inclusive. Similarly the hook 34, having the threaded portions 35 and held in position by the nut 36, passes through the projection 29. The cable 37 is attached to this hook and serves to move the saw mill carriage to the left, as indicated in the above mentioned figures. Compensation for inequalities in the lengths of the cables 33 and 37 may be effected by suitable adjustment of the hooks 30 or 34 by means of the nuts 32 or 36 which engage the threaded portions of said hooks.

On the left hand side of the right cross member 15, as indicated in the drawings, is an abutment plate 38 which is engaged by the I-shaped projection 27 when the block 26 is moved to its extreme position to the right. Mounted on the side of the opposite cross member 15 is the bracket 39 in which is mounted the cam or retainer 40 having the handle 41. This cam has a round disk portion 42 having the notches 43 and 44 in its periphery and the abutment portion 45. The spring controlled locking pin 46 is mounted in the bracket 39 and engages the notch 44 when the cam 40 is in its lowered position, as shown in Fig. 3, and engages the notch 43 when the cam is in its raised position, as indicated in Fig. 4. It will thus be apparent that when the cam 40 is raised, the block 26 and its I-shaped projection 27 can travel independently between the bracket 39 and the abutment plate 38, whereas when the cam is in its lowered position, the extension 27 is engaged by the abutment plate 38 and the abutment portion 45 of the cam 40, so that longitudinal movement of the block 26 is prevented.

Attached to the ends of the shaft 23, by means of the toggle connections 47, are the shifting rods 48 which pass through suitable slots in the lower portions of the sleeves 18, 18. These shifting rods 48 are connected with the platform 14 by means of the toggles 49.

Having thus described the construction of the saw mill carriage of my invention, its operation may now be readily understood.

Let us assume that when a log is being sawed the carriage is moved to the right, as shown in Figs. 1, 2, 3, 4 and 6. In this case the carriage will be moved by action of the cable 33 on the hook 30, and the parts will be in the positions indicated in Figs. 1, 2, 3 and 6 except that in normal operation, the cam 40 will be raised, as shown in Fig. 4. All of the parts will remain in the positions just mentioned until the log has been cut through. We will assume that the cutting of the log begins at the side which would be at the left when one faces in the direction of travel of the log when it is being cut, and that the boards or planks are being sawed successively toward the right of the log. It will thus be evident that after each cut on the log, the platform should be moved toward the right in order to cause the log to clear the saw. When a board or plank has been cut from the log and it is desired to return the carriage to its original position, power is applied on the cable 37 which is transmitted to the hook 34 and the block 26 is moved to the position indicated in Fig. 4. This movement of block 26 causes the shafts 22 and 23 to be similarly moved to the left in the spring controlled journal boxes 20 and 21, and the shifting rods 48 are thereby simultaneously caused to move longitudinally to the left. The journal boxes 20 and 21, by their pressure upon the shifting rods, act as friction draft devices to prevent the projection 27 on the shifting block 26 from striking the cam 40 too forcibly. On account of the engagement of each shifting rod 48 with its corresponding sleeve 18, lateral movement of these shifting rods is prevented. As the rods are moved longitudinally therefore, since the platform 14 has only lateral movement on the axles 11, the longitudinal movement of the shifting rods 48 will, by means of the toggles 49, cause the platform 14 to be bodily shifted to the right, considered from the point of view of one who faces the direction in which the log travels when it is being cut. When the platform 14 is shifted to the right as just described, it will be apparent that the mechanism attached to the cross members 15, 15 must be simultaneously shifted, and in order to allow this to take place, the toggles 47, 47 are provided between the ends of the shaft 23 and the shifting rods 48. It will be apparent that the above mentioned shifting of the platform 14 takes place before the carriage, as a whole, begins to move longitudinally, inasmuch as the longitudinal movement cannot be affected when the cam 40 is raised until the I-shaped projection 27 engages the bracket 39, and by the time this occurs, the lateral shifting of the platform must have been completed. The path of travel of the platform 14 is therefore in the shape of a rectangle.

It sometimes happens that when a saw cut is being made, it is desired to move back the carriage a short distance without shifting the platform laterally. This may readily be accomplished by moving the cam 40 into the position shown in Fig. 3. The block 26 can now have no longitudinal movement so that there will be no lateral movement of the platform 14.

It will be apparent to those skilled in the art that many changes could be made in the detailed construction of the parts which I have described without departing from the spirit of my invention.

What I claim is:

1. In a saw mill carriage, the combination of a platform, means for supporting said platform, means for longitudinally and reciprocatingly moving said platform and its supporting means, means for shifting said platform laterally on the supporting means before its longitudinal movement begins, the path of travel of said platform thereby being made of rectangular shape, and frictional means for retarding the movement of the laterally shifting means, substantially as described.

2. In a saw mill carriage, the combination of supporting axles, a platform laterally movable on said axles, shifting means carried by said platform, oppositely disposed propelling means attached to said shifting means, the application of power to said propelling means serving to move the platform into a corresponding lateral position and then to move the carriage in a longitudinal direction, and friction means for preventing shock when power is so applied, substantially as described.

3. In a saw mill carriage, the combination of supporting axles, a platform laterally movable on said axles, shifting means supported by said platform, and having movement longitudinally thereof, oppositely disposed propelling means attached to said shifting means, the application of power to said propelling means serving to move the platform into a corresponding lateral position and then to move the carriage in a longitudinal direction, friction means for retarding the movement of said shifting means, and means for preventing at will the lateral movement of said platform, substantially as described.

4. In a saw mill carriage, the combination of supporting axles, a platform laterally movable on said axles, a shifting block movable with respect to said platform, means for moving the platform laterally on said axles when the shifting block is moved longitudinally, means for retarding the movement of said block, and propelling means attached to said shifting block and adapted to move the same in opposite longitudinal directions, substantially as described.

5. In a saw mill carriage, the combination of supporting axles, a platform laterally movable on said axles, a shifting block, a shaft on which said block is mounted, means for carrying said shaft supported by said platform and adapted to apply pressure thereto, a shifting rod connected with said shaft, means connecting said platform with said shifting rod whereby when the same is moved longitudinally, the platform is shifted laterally, and propelling means attached to said shifting block for moving the carriage in opposite longitudinal directions, substantially as described.

6. In a saw mill carriage, the combination of supporting axles, a platform laterally movable on said axles, a shifting block, a shaft on which said block is mounted, spring pressed means for carrying said shaft supported by said platform and frictionally engaging said shaft, a shifting rod connected with said shaft, means connecting said platform with said shifting rod whereby when the latter is moved longitudinally the platform is shifted laterally, propelling means attached to said shifting block for moving the same in opposite longitudinal directions with relation to the platform and also to move the carriage bodily, and means for preventing at will longitudinal movement of said shifting block with respect to said platform when the carriage is moved thereby preventing lateral movement of said platform, substantially as described.

7. In a saw mill carriage, the combination of supporting axles, a platform laterally movable on said axis, a shifting block arranged to have movement with respect to the platform, a shaft on which said shifting block is mounted, means for supporting said shaft from said platform, a shifting rod attached to said shaft, means for preventing lateral movement of said shifting rod, means supporting said shifting rod on said platform, propelling means adapted to move said shifting block longitudinally with respect to said platform into engagement therewith and simultaneously causing lateral movement of the platform by the action of said shifting rod, and means for preventing shock to the platform when said block engages the latter, substantially as described.

8. In a saw mill carriage, the combination of supporting axles, a platform laterally shiftable thereon, a shifting block longitudinally movable on the platform, a draft appliance connected to the block, a shifting rod guided for longitudinal movement with reference to the axles, and a toggle connection between the rod and the platform and between rod and the block, substantially as described.

9. In a saw mill carriage, the combination of supporting axles, a platform laterally shiftable thereon, a shifting block longitudinally movable on the platform, a draft appliance connected to the block, a shifting rod guided for longitudinal movement with reference to the axles, a toggle connection between rod and the platform and between the rod and the block, and friction braking mechanism arranged to retard the movement of the shifting block, substantially as described.

BURT D. STEVENS.

Witnesses:
F. A. HORSTMANN,
TELLA SOLIEN.

Copies of this patent may be obtained for five cents each, by addressing the "Commissioner of Patents, Washington, D. C."